April 28, 1970  R. A. BURKLEY ET AL  3,508,987

METHOD FOR MAKING THIN GLASS-FACED PLASTIC COMPOSITES

Filed May 12, 1964  2 Sheets-Sheet 1

INVENTORS.
RALPH A. BURKLEY
DONALD C. CULLY
JOHN L. FOLK
BY
*A.H. Oldham*
ATTORNEY April 28, 1970   R. A. BURKLEY ET AL   3,508,987
METHOD FOR MAKING THIN GLASS-FACED PLASTIC COMPOSITES
Filed May 12, 1964   2 Sheets-Sheet 2

INVENTORS.
RALPH A. BURKLEY
DONALD C. CULLY
JOHN L. FOLK
BY *SHOldham*
ATTORNEY

United States Patent Office 3,508,987
Patented Apr. 28, 1970

3,508,987
METHOD FOR MAKING THIN GLASS-FACED PLASTIC COMPOSITES
Ralph A. Burkley, Cuyahoga Falls, Donald C. Cully, Tallmadge, and John L. Folk, Akron, Ohio, assignors to Goodyear Aerospace Corporation, Akron, Ohio, a corporation of Delaware
Filed May 12, 1964, Ser. No. 366,743
Int. Cl. B32b *17/10;* C03c *27/12*
U.S. Cl. 156—99       3 Claims

ABSTRACT OF THE DISCLOSURE

A method or process of providing accurately shaped, usually specially contoured laminates comprising providing a contoured primary carrier sheet and then attaching a thin glass-faced sheet to one surface of the carrier sheet while reinforcing the glass sheet and maintaining or providing one face of the glass sheet contoured complementary to a carrier surface of the carrier sheet. The glass sheet is reinforced, as by attaching it by vacuum forces to a rigid backing or reinforcing member and then attaching the unit of the glass sheet and reinforcing member to the carrier sheet to provide an assembly thereof with associated faces of the carrier sheet and glass sheet in accurately spaced relationship. A liquid thermosetting resin is provided between the space surfaces of the carrier sheet and glass sheet and then the entire assembly is heated to thermoset the resin and bond the glass sheets to the carrier sheet. Apparatus for performing such method is also disclosed.

---

The present invention relates to balanced and/or accurately shaped multi-ply laminated articles and to methods of and apparatus for making these composite products.

The invention further relates to thin glass-faced, flat or single, or compoundly curved, transparent plastic articles and to a unique method and apparatus for fabricating these glass-faced, multiple-ply, balanced and/or accurately shaped laminated structures. Specifically, the invention relates to laminated articles of balanced and/or accurate shape in which the abrasion resistance of glass and the lightweight and structural integrity of transparent plastics, particularly stretch-oriented polymethyl methacrylate, are combined advantageously.

Particularly useful products of the type related to this invention are thin, glass-faced, laminated transparent plastic enclosures, such as canopies, windshield panels, passenger windows, etc. for aircraft and helicopter cockpits, cabins, crew compartments, passenger compartments, etc. These enclosures, in general, must be highly transparent and their optical clarity and other desirable characteristics must be preserved over some appreciable operating life. In many cases, transparent enclosures of this type are equipped with heating devices, usually electrically conductive transparent coating systems for de-icing, anti-icing, and de-fogging purposes. Many of these structures are subjected to extremes of temperature (—65 up to 400° F.) and/or they may have various foreign articles, such as birds, impacted against them. In addition, they may be punctured by bullets and, when this happens, it is extremely difficult to prevent excessive shattering, which is optically objectionable and is particularly apt to become profuse in laminated glass transparencies. A particularly common condition, which shortens the service life of transparent plastic aircraft enclosures to some degree, is the abrasive action of impinging foreign particles swirled up into the air during ground level operations. Abrasive and scratching effects of moving windshield wiper blades also shortens the service life of plastic transparencies, and usually limits the use of these plastic enclosures to vision areas on which windshield wipers are not used.

Because no ideal transparent enclosure material has been developed to date, manufacturers and consumers of these products have repeatedly sought to modify existing materials in an effort to optimize one or more of them. It is well known that the shattering tendencies of glass have been reduced by tempering, annealing, chemical strengthening, etc. However, it is also well known that these improvements do not make the shatter resistance of glass fully dependable and, therefore, even these strengthened glasses usually are used in laminated form wherein a tough, flexible, plastic intermediate layer, such as plasticized polyvinyl butyral, retains the broken fragments in position when the glass is fractured. These modified glasses, although heretofore used almost exclusively in aircraft enclosures where windshield wipers are involved, still are objectionably heavy for aircraft use and they shatter profusely when penetrated by bullets, thereby virtually eliminating optical transparency. Plastics, being much lighter in weight and more shatter resistant than glass, are more suitable insofar as these specific properties are concerned. But plastic materials generally need to be modified to improve their resistance to crazing, crack propagation, abrasion, scratching, high temperature strength loss, and, in some cases, improvements in impact strength are required. However, these modified and improved plastics still resist scratching poorly, particularly under conditions involved in windshield wiper action. This inferior scratch resistance has prohibited the use of transparent plastics in many aircraft enclosures in which their light weight in particular would be advantageous. Therefore, repeated attempts previously have been made to increase their scratch or abrasion resistance without serious impairment of their optical quality. It has been found that this is not easily accomplished. Sprayable surface hardeners impair optical quality by attacking the smooth acrylic surface, thereby wrinkling or distorting it, or the sprayed-on hardeners themselves are wrinkled, blemished, hazy, and/or distorted after drying, baking, curing, etc. Bonded surface films also have their own built-in optical defects such as pits, streaks, blemishes, haze, distorted areas, foreign particles entrapped in the bonding layers, etc. Many bonded surface films, although more scratch and abrasion resistant than the transparent plastic material being protected, have only slightly better scratch and abrasion resistance themselves and therefore, do not effectively extend the optical service life of the protected transparent plastic article, particularly under extreme abrasive or scratching conditions, such as are encountered in the operation of windshield wipers, and the like.

A general object of this invention is to provide optically superior laminated transparent plastic articles with improved scratch and abrasion resistance and to provide a novel and improved method and apparatus for fabricating said articles of manufacture.

Another broad object of this invention is to provide laminated articles of manufacture and novel and improved methods for laminating said articles which are composites wherein outer layers of thin glass are laminated to a main, structural, transparent plastic middle layer of high optical quality, and where a three ply laminate with one glass face or a five ply laminate with two glass faces or surface sheets are produced.

A specific object of this invention is to provide optically superior laminated transparent plastic articles of manufacture which are essentially balanced and/or accurately shaped multi-ply composites wherein flat, or contoured thin glass outer plies are laminated with tough, flexible, transparent, cast-in-place, cured in situ, thermosetting resin intermediate layers to a complementary flat, or contoured highly transparent rigid plastic main structural or carrier ply which usually is, by comparison, appreciably thicker than the thin glass and intermediate laminating, or bonding plies.

Another specific object of this invention is to provide a novel and improved method and apparatus for manufacturing laminated articles which are essentially balanced and/or accurately shaped composites in which flat, or contoured thin glass outer plies are retained to a preformed shape and are attached through tough, flexible, transparent, cast-in-place, cured in situ thermosetting resin intermediate layers to a complementary flat, or contoured highly transparent rigid plastic main structural or carrier ply which usually is, by comparison, appreciably thicker than the other layers.

Another object of this invention is to provide novel flat, or single, or compound curvature transparent plastic enclosures which will not be objectionably scratched or abraded by windshield wipers and the like.

A particular object of this invention is to provide multiple ply laminates and a novel and improved method for fabricating them, as, for example, a five ply laminated or composite article, which is balanced and/or accurately shaped, and wherein two flat or contoured transparent thin glass surface sheets, layers, or shells, are attached one at a time by tough, flexible, transparent, cast-in-place, cured in situ, uniform thickness, thermosetting resin intermediate layers to a complementary contoured middle structural or carrier layer of an essentially rigid, tough, transparent plastic as, for example, cast or stretch-oriented polymethyl methacrylate.

Another particular object of the present invention is to provide contoured thin glass-faced plastic transparent laminated articles in which, for example, one or two contoured thin glass sheets or layers of preformed geometry are attached to a main or structural transparent, essentially rigid plastic layer of complementary geometry and usually much thicker, by comparison, said contoured thin glass and main structural plastic layers being accurately preshaped and positioned to yield any predesigned symmetry and relationship between the layers of the laminate.

A further particular object of the present invention is to provide a method for attaching contoured thin glass surface sheets to a complementary contoured, comparatively thicker, rigid transparent plastic main structural ply with castable transparent thermosetting intermediate layers and wherein the thin glass surface sheets are secured by a vacuum force to a complementary contoured rigid backing sheet throughout the entire assembly operation, including the process of heating the castable intermediate layer during in situ curing to set such layer and to bond the glass sheet to the at least substantially rigid transparent plastic main structural ply thereby facilitating not only the attainment of uniform intermediate layer thickness but also the accurate positioning of the contoured, preshaped or pretrimmed thin glass surface sheets with respect to the complementary contoured, preshaped, main structural ply or carrier sheet.

A specific object of this invention is to provide a laminated transparent composite which is essentially plastic except for one or more local areas wherein a thin glass surface sheet is attached for the purpose of protecting the main structural plastic ply from severe scratching, or abrasive envisionments such as, for example, the wearing action of windshield wiper blades, and/or the erosion of rain, sleet, dust particles, sand storms, and the like.

A further specific object of this invention is to provide contoured, rigid backing sheets with special plastic film overlays whereby vacuum forces can be applied between the backing sheet and the plastic film and be transmitted to a desired apertured center area of the film for use in accurately positioning, forming, shaping, or retaining a thin glass sheet to a desired contour while it is attached to a substantially rigid main structural or carrier sheet.

A further object of the invention is to provide novel and improved balanced and/or accurately shaped composites where special external forces are applied to a thin glass sheet to aid in maintaining it in accurately spaced relation to a carrier sheet or layer while a plastic bonding layer is flowed between the glass sheet and the carrier layer and then is heat cured to provide the desired bond between the glass sheet and its carrier layer.

The foregoing and other objects and advantages of the present invention will be made more apparent as the specification proceeds.

Attention now is directed to the accompanying drawings, wherein.

When referring to corresponding numbers shown in the drawings and referred to in the specification, corresponding numerals are used to facilitate comparison therebetween.

THIN GLASS-FACED LAMINATED ARTICLES OF THE INVENTION

Figure 1:
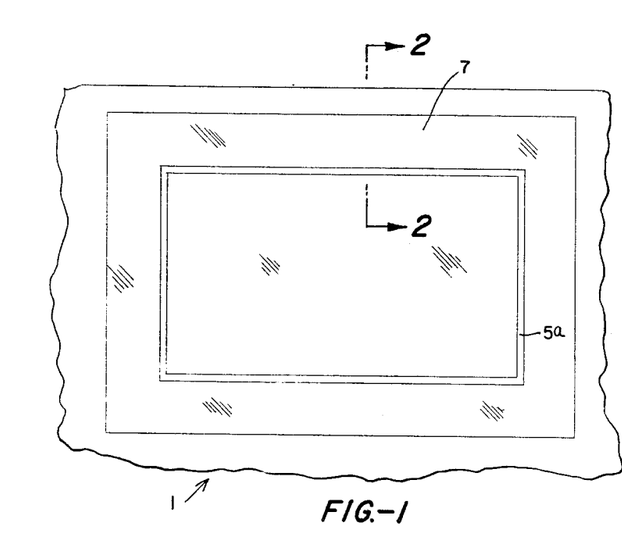
FIG. 1 is an elevation of a thin glass-faced plastic composite of the type provided by this invention.
Figure 2:
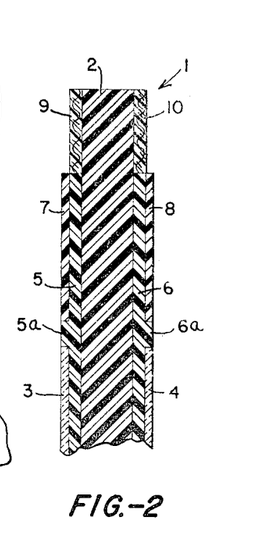
FIG. 2 is a fragmentary enlarged vertical section, taken on line 2—2 of FIG. 1, to show the various thin glass and plastic layers forming the composite.
Figure 3:
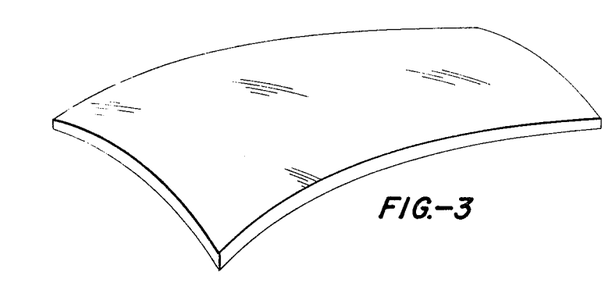
FIG. 3 is a perspective view showing a contoured multi-ply composite of the type provided by the present invention.

Referring specifically now to the structures shown in the drawings, a composite formed by the process of the invention is indicated as a whole by the numeral 1. This particular composite is shown as made from a center, carrier layer or sheet 2 which center, carrier, or intermediate sheet is made from either as cast, or stretched polymethyl methacrylate, sold under the trademark name of "Plexiglas," and which carrier sheet or layer is described more fully hereinafter. Such sheet 2 is of any predetermined, or desired contour and is covered at a local area, or central section thereof, in the composite as shown, by a pair of relatively thin glass-faced sheets 3 and 4. Such face sheets may be made from glass of any desired composition, as described hereinafter, and are quite thin, such as from about .030 inch up to about .080 inch in thickness. The face sheets 3 and 4 are secured to the two faces of the center sheet 2 by bonding layers 5 and 6 that are formed from an initially liquid, castable, thermosetting resin material, such as a polyester, or other materials as herein described, so as to provide transparent bonding layers 5 and 6 that are formed in situ and which intimately and directly bond to the exposed faces of the center sheet 2 and the inner faces of the face sheets 3 and 4 to provide uniformly adhered attaching or bonding layers to form the balanced or accurately shaped composite 1, all as described hereinafter in more detail. Usually these face sheets 3 and 4 are more or less "framed" on the center sheet 2 to aid in providing a finished unit which may have attachment means secured thereto, or to aid in reinforcing the composite 1 in the multi-ply covered section thereof. Thus, in the composite 1, cover or framing strips, or sheets 7 and 8, as hereinafter described, are also directly attached to the center sheet 2 adjacent, but spaced from, the margins of the face sheets 3 and 4 by the same bonding layers 5 and 6 as are provided to attach the face sheets to the center sheet. In the process of forming the bonding layers 5 and 6, special thickened sections or areas 5a and 6a are provided therein at joints, or spaces provided intermediate the peripheries of the face sheets 3 and 4 and the adjacent, or inner edges of the cover or frame sheets 7 and 8.

Any desired reinforcing members, or attachment means, can be associated with any desired portions of the center sheet 2 that are not covered by the face sheets 3 and 4 or the frame, or face sheets 7 and 8, so that edge sheets 9 and 10 are shown in FIGS. 1 and 2, and may be suitably bonded to the intermediate, or center sheet 2 at the margins thereof. Such edge sheets 9 and 10 may be made from any conventional material, such as an Orlon fabric that is attached or bonded to the center sheet 2 by conventional bonding cements, resins or the like.

Figure 4:
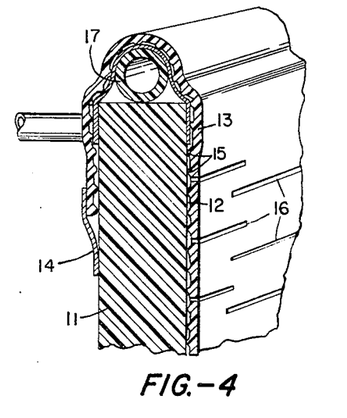
FIG. 4 is a fragmentary vertical section, partially shown in perspective, of a backing sheet and associated means used in the practice of the present invention and forming part of the novel apparatus of the invention.

The thin glass-faced transparent plastic laminated articles of this invention may be constructed from a wide variety of materials. The thin glass surface of face sheets 3 and 4 may consist of any clear, low colored, transparent type of glass, including soda-lime, alumino-silicate, "Pyrex" and "Vycor," marketed by Corning Glass Works, tempered glasses such as "Herculite I," marketed by Pittsburgh Plate Glass Company, and "Tufflex," marketed by Libbey-Owens-Ford Glass Company, chemically strengthened glasses, such as "Chemcor," marketed by Corning Glass Works, and "Z-Glass" and "Herculite II," marketed by Pittsburgh Plate Glass Company, etc. For example, soda-lime glass may be used in the interest of economy when maximum strength and flexure requirements are not required and where probability of impact from relatively large flying objects is slight. On the other hand, strength limitations of the thin glass-faced laminated transparent plastic articles of this invention will be increased measurably and impact resistance will be optimized through the use of much more expensive chemically strengthened glasses.

The transparent, flexible, tough, cast-in-place bonding, or intermediate layers 5 and 6 for attaching the thin glass surface sheets 3 and 4 and the thin rigid transparent plastic surface sheets 7 and 8, where applicable, to the main rigid transparent structural sheet, or ply 2, may be any liquid, thermosetting, fully reactive resin composition which can be cast in situ and becomes a flexible, tough, transparent layer when fully cured. Examples of intermediate layers 5 and 6 which are applicable to this invention are those referred to in the industry as flexible polyester resins, flexibilized epoxy resins, polyurethane casting resins, silicone potting compounds, etc.

Examples of the type referred to as flexible polyester resins are "Paraplex P-13," marketed by Rohm and Haas Company, "Selectron 5208," marketed by Pittsburgh Plate Glass Company, "Laminac 4134" made by American Cyanamid Company, "Vibren 121," marketed by Naugatuck Chemical Company, etc. These resins, when catalyzed with up to two percent by weight of an organic peroxide, such as benzoyl peroxide, for example, cure to tough, flexible, transparent products. Chemically, these and other commercially available polyester resins are well known in the art, and they are described in a number of technical articles and textbooks, one of which is called "Polyesters and Their Applications" from Bjorksten Research Laboratories, Inc. Generally speaking, the commercially available flexible polyester resins which are adapted for use as intermediate layers 5 and 6 are essentially clear liquid resins consisting of a cross-linking agent, usually styrene, which generally makes up about 30 to about 50 percent of the total weight of resin, and about 70 to about 50 percent by weight of an alkyd resin which is the reaction product of a dihydric alcohol, also referred to as a diol, usually ethylene glycol or some mixture of ethylene glycol and propylene glycol, a saturated dibasic acid, usually adipic acid, and an $\alpha,\beta$-unsaturated dibasic acid or anhydride, usually maleic anhydride or fumaric acid, with the ratio of saturated to $\alpha,\beta$-unsaturated dibasic acid usually being in the range of about 4:1 to 6:1.

Other flexible polyester resins, not necessarily commercially available, which may be useful as intermediate layers 5 and 6 of this invention are similar products in which all, or parts of the styrene cross-linking agent is replaced with vinyl toluene, diallyl phthalate, any of a great number of acrylate or methacrylate monomers as, for example, methyl methacrylate, n-butyl acrylate, n-butyl methacrylate, ethyl acrylate, etc., numerous allyl and vinyl compounds, and, in fact, any carbon compound containing ethylenic unsaturation, which is capable of undergoing free radical addition polymerization, and is sufficiently compatible with the particular alkyd involved to yield a clear, transparent cured product.

Still other flexible polyester resins which are adaptable to this invention as intermediate layer materials 5 and 6 are those in which all or part of the adipic acid used in preparing the alkyd resin is replaced by other long chain unsaturated dibasic acids, such as malonic, succinic, glutaric, pimelic, sorbic, sebacic, etc. and also those in which all or part of the $\alpha, \beta$-unsaturated maleic anhydride and/or fumaric acid are replaced by other $\alpha,\beta$-unsaturated acids such as muconic, dihydromuconic, citraconic, mesaconic, itaconic, etc. insofar as these substitutions may be acomplished and still yield castable transparent, low colored, liquid resins which cure to tough, flexible, transparent products. Addition of chemicals for light stabilization, fire retardency, improved heat resistance, etc. and/or the use of special cross-linking agents for imparting special properties of this type to the cured resin products will not detract from the usefulness of these resins for intermediate layers provided these additions and/or modifications do not destroy the castability of the liquid resins or the toughness, flexibility, and transparency of cured thin layers.

Flexibilized epoxy resins which are adaptable to this invention as intermediate layers 5 and 6, like the flexible polyester resins, are well known in the art. Generally speaking, the adaptable resins are essentially liquid blends of (a) the commonly used epoxy resins which usually are either reaction products of epichlorhydrin and Bisphenol A or the reaction products of peracetic acid, which may be formed in situ from glacial acetic acid and hydrogen, peroxide, and diethylenically unsaturated organic compounds ususally containing aromatic ring structures and (b) flexibilizing modifiers which may be either long chain aliphatic diepoxide resins, diepoxide resins derived from cashew nut oil, polysulfide resins, polyamide resins, long chain aliphatic diamines, certain of the compounds referred to in the industry as amine adducts, or combinations of these various flexibilizing modifiers. These flexibilized epoxy resins may be cured, that is, cross-linked through the epoxide groups and, in some cases available hydroxyl groups, through the use of any convenient curing agents selected from the group consisting of polyfunctional primary or secondary aliphatic or aromatic amines, hydroxy-substituted aliphatic amines, amine adducts, polybasic organic acids or anhydrides (with or without tertiary amines at catalysts), Lewis acids, boron trifluoride complexes, compatible mixtures of these chemicals, etc. In some cases, as obviously indicated above for long chain aliphatic amines and amine adducts, flexibility can be increased through effective selection of curing agents. However, in keeping with the intent of the present invention, it is imperative that specific materials be selected from the cited array of flexibilized epoxy resin blends and curing agents which when thoroughly mixed are suitable for casting and curing in situ and which when cured in thin layers will be flexible, tough, virtually transparent, and low-colored.

For best results, the cured products of flexibilized epoxy resin blends and curing agents selected for use as intermediate layers 5 and 6 in this invention should possess tensile strength properties in the range of about 750 to about 2500 pounds per square inch and should elongate under tensile loads at least about 85 to about 350 percent without failure, and cured products with low tensile strength and high elongation are preferred.

Particular flexibilized epoxy resin systems which have been found useful for intermediate layers 5 and 6 of the thin glass-faced laminated transparent plastic products of this invention, schematically presented in FIGURES 1 through 3, are well blended mixtures of about 35 to about 50 percent by weight of the reaction product of epichlorhydrin as Bisphenol A having an epoxide equivalent weight in the range of about 172 to about 178 and about 65 to about 30 percent by weight of a long chain aliphatic diepoxide having the general formula:

and having an epoxide equivalent weight in the range of about 305 to about 335, as, for example, cited percentages of mixtures of "DER-332" and "DER-732," marketed by Dow Chemical Company, said epoxy resin blends thoroughly mixed and cured (cross-linked) with equivalent quantities of N-aminoethylpiperazine. Obviously, other similar blends of reaction products of epichlorhydrin and Bisphenol A and long chain aliphatic diepoxide resins, which, when combined have aggregate epoxide equivalent weights in the range of about 240 to about 280, and which when cross-linked with equivalent quantities of N-aminoethylpiperazine yield though, flexible, transparent, low-colored products, particularly in thin layers, also are suitable for use as intermediate layers 5 and 6 of the present invention. Other epoxide resins, particularly reaction products of epichlorhydrin and Bisphenol A, and epoxide resin blends, having epoxide equivalent weights falling in the cited 240–280 range, depending upon exitence of long aliphatic chain within their structures, may or may not be adaptable, without further modification, to this invention as intermediate layers 5 and 6. Other examples of reaction products of epichlorhydrin and Bisphenol A which may be substituted for Dow "DER-332" in the cited resin blend, with some adjustment in percentage in some case, because of variations in epoxide equivalent weight, are Dow Chemical "DER-331," Shell Chemical "Epons 828" or "834," "Bakelite ERL-2774" or "ERL-3794," Ciba "Araldite 6020," "6030," or "6040," Jones-Dabney "Epi-Rez 510" and "515," etc. Other long chain aliphatic diepoxides, which may be substituted for the Dow "DER-732" in the cited resin blends, with percentage adjustments for variation in chain length and, therefore, epoxide equivalent are Dow "DER-736," Shell these resin blends, or, in some cases, because of its special flexible type diepoxide resin which may be used in the same capacity as the long chain aliphatic diepoxide in these resin blends, or, in some cases, because of its special molecular structure, which is as follows:

may be used without modification, is the dipoxide resin derived from cashew nut oil. Other curing agents may be used in place of the N-aminoethylpiperazine cited in the previous examples, provided they do not destroy the suitability of the liquid epoxy resin blends for casting and curing in situ and provided the cured products are tough, flexible, transparent, and low-colored, particularly when cast and cured in thin layers. Other curing agents which are particularly useful for cross-linking the various flexibilized epoxy resins discussed previously as suitable for intermediate layers 5 and 6 of the present invention are meta-xylylxylenediamine, acrylonitrile adducts of diethylene triamine, hexamethylene diamine, long-chain alkyl diamines, 1,8 diamino-p-menthane, dodecenyl succinic anhydride, dodecylsuccinic anhydride, hexahydrophthalic anhydride, the latter two curing agents being catalyzed with a small amount of benzyldimethyl or other tertiary amine, and other curing agents, which may be selected from the group of curing agnts cited earlier. Along with the use of curing agents other than N-aminoethylpiperazine, some modification in the rations of Bisphenol A epichlorhydrin-type epoxy to long chain aliphatic diepoxide, or other flexibilizing diepoxide are required for best results. The degree of change in this ratio and the nature of adjustment will be dependent upon the particular curing agent used.

Other particular flexibilized epoxy resin systems which have been found particularly useful as intermediate layers 5 and 6 of this invention are well blended mixtures of about 50 to about 75 percent by weight of liquid reaction products of epichlorhydrin and Bisphenol A, which are those reaction products having epoxide equivalent weights of about 170 to about 290 and about 25 to about 50 percent by weight of liquid polysulfide resins, which, disregarding a small amount of branching and cross-linking, have the general structural formula:

and have molecular weights in the range of about 500 to about 3000. Applicable epichlorhydrin-Bisphenol A derived epoxy resins have already been discussed in this specification.

Examples of applicable liquid polysulfide resins are "Thiokols LP-2," "LP-3," "LP-8," and "LP-33," marketed by the Thiokol Corporation. These useful liquid epoxy polysulfide resin blends are cured with equivalent quantities (based only on the epoxide content) of polyamines, substituted polyamines, and modified polyamines, most commonly tri (dimethyl) aminophenol, tetraethylene pentamine, triethylene tetramine, dimethylaminophenol, 2-ethylhexoic acid and acetic salts of tri (dimethyl) aminophenol. The polyamine cured products of these liquid epoxy-polysulfide blends are usually transparent but colored pale yellow or brown. This coloring can be tolerated, particularly in thin layers, and for some applications is beneficial for sun-screening, prohibiting glare, etc.

The polyurethanes which are applicable to this invention as intermediate layers have been used extensively in the preparation of urethane rubbers, flexible urethane foams, and as casting and potting compounds for electrical equipment, fabrication of various molded articles, etc. The particular compounds which are applicable to the present invention as intermediate layers 5 and 6 are three general types. In the first, liquid saturated long chain polyester resin prepolymers with an unreacted hydroxyl group distributed along the chain are cross-linked with liquid diisocyanates to form rubber-like, flexible, tough, low durometer, transparent, low colored products. In the second type, linear prepolymers are made by reacting dihydroxy polyglycols with an excess of diisocyanate and these prepolymers are subsequently cross-linked with polyfunctional primary amines, triols, mixtures of diols and triols, polyols, mixtures of triols and polyfunctional diamines with small amounts of tertiary amines as catalysts, etc. The third type of polyurethane compound which can be adapted to this invention in the role of castable, flexible intermediate layers 5 and 6 are essentially prepolymers formed by the reaction of liquid triols, mixtures of diols and triols, or higher functional liquid polyols with liquid diisocyanates in the ratio one mole of diisocyanate for each hydroxy equivalent of the triol or polyol, which are subsequently propagated into linear chains and cross-linked by reaction with difunctional polyglycols or multifunctional polyols and/or polyglycols. Wide ranges of flexibility and elasticity, tear strength, tensile strength, resistance to solvents, etc. are possible, depending on the selection of initial reactants for the prepolymers and/or cross-linking curing agents in the cured products of all three types of polyurethanes cited.

One type of polyurethane which is particularly useful in forming the layers 5 and 6 in the laminated products of this invention is referred to in the industry as the polyether type and most examples are essentially liquid prepolymers of dihydroxypolyglycols reacted with liquid diisocyanate having unreacted isocyanate functionality in the range of about 4.0 to at least about 8.0 percent of their total weight and which are cross-linked with polyfunctional amines, particularly 4,4'-methylene-bis-(2-chloraniline), triols, particularly castor oil, 1,2,6-hexanetriol, trimethylol-propane, triethanolamine, etc., and mixtures of diols and triols, for example, castor oil and 1,4-butanediol, trimethylolpropane and 1,4-butanediol, methyldiethanol amine and triethanolamine, etc. Other suitable amine type cross-linking agents, which are highly reactive and require special handling equipment for casting are triethylenetetramine, hexamethylene diamine, 4,4'-diaminobenzophenone, diaminodiphenylsulfone, diaminodiphenylamine, etc. In general, the polyol cross-linked products are more nearly water white, have better low temperature flexibility, lower tensile strength, lower durometer, and lower high temperature strength than the amine cross-linked cured product.

Another type of polyurethane which is particularly useful for forming the intermediate layers is referred to as the polyester type and these are essentially liquid saturated polyester prepolymers with hydroxyl number of at least about 40 which are cross-linked with liquid diisocyanates. Flexibility is varied to some extent in the cured products by varying the amounts of diisocyanate used to cure these polyester type prepolymers, but the most reliable physical characteristics are obtained when equivalent amounts of diisocyanate are used. In general, cured polyurethane intermediate layers have superior toughness, tear strength, good transparency, low color, good low temperature strength, and adequate heat resistance. However, they require special handling to insure that atmospheric moisture will not cause bubbling or foaming and to cope with their usually high initial viscosity. Some examples of commercially available polyurethanes which can be used for intermediate layers 5 and 6 in the present invention are "Adiprene L–100," marketed by E. I. du Pont de Nemours and Co., Goodyear Tire and Rubber Co. Neothane Resin "R92X2831," Mobay Chemical Company "Multrathanes R–26" and "E–84," "Humiseal 2A258," marketed by Columbia Technical Corporation, etc.

The transparent castable silicones which are adaptable for use as the intermediate layers 5 and/or 6 of this invention are those liquid resins which cure upon addition of catalysts and under influence of either room or moderately elevated temperatures (not higher than 220° F.) to transparent, virtually haze free, low colored, tough, flexible, thermoset products, particularly in thin layers. Some examples of resins which have been found satisfactory for this purpose are "Sylgard 182" and "184," marketed by Dow-Corning Corporation, General Electric Resin "LTV–602," etc. The resins of this type are essentially mixtures of organopoly-siloxanes which are supplied in the uncured or semi-cured state wherein the cure is completed in situ using catalysts, for example, organic salts of tin, zinc, iron, lead, etc. such as dibutyltin dilaurate, zinc octoate, iron octoate, tin octoate, etc., and certain amino compounds as, for example, N-methylmorpholine, etc. The mixtures of organopolysiloxanes which are particularly adaptable as intermediate layers are low to intermediate viscosity liquid blends of water white transparent, virtually haze free polysiloxanes having in their structure silicon atoms of varying degrees of functionality and in which the siloxane $(-Si-O-)_n$ backbone has side chain substitutions which are essentially organic radicals, for example, methyl, ethyl, ethoxy, phenyl, phenoxy, etc., except for widely dispersed hydroxyl (—OH) groups. When the catalysts are added to these particular organopolysiloxane mixtures, they are cured through reactivity of hydroxyl groups with each other whereupon molecules of water and cross-linked, colorless, flexible, transparent, relatively tough, virtually haze free polymeric networks are the reaction products.

For the main structural ply, or sheet 2 of the thin glass-faced laminated articles of the present invention, the most desirable materials at present are stretch oriented sheets of polymethyl methacrylate. The specific type of methyl methacrylate polymer which should see widespread use in the capacity of carrier or center sheets 2 of these laminated articles is stretched "Plexiglas 55." This particular tough, rigid, optically superior transparent plastic is manufactured in two distinct steps. In the first step, Rohm and Haas Company, processes methyl methacrylate modified with a small amount of suitable cross linking agent, an ultraviolet absorber, and possibly other additives to impart advantageous properties the resulting polymer, in such a way that cast sheets of polymer with unusually good clarity, transparency, low color, and surface smoothness and luster are obtained. The amount of cross-linking agent used and its identify are not known, but it is well known that this particular additive is used in relatively small percentages to enhance the thermal properties, craze resistance, and solvent resistance of the resulting cast sheet materials without critically limiting their formability and stretchability. In the second step of processing, these cast sheets of "Plexiglas 55" are multiaxially, also sometimes referred to as biaxially, stretched to a predetermined degree, for example, about 50 to about 75 percent, in such a way that craze and crack propagation resistance and toughness are improved without appreciably impairing optical characteristics.

Although stretched polymethyl methacrylate provides the most satisfactory main structural or carriers layers 2, it is obvious that other rigid transparent plastic sheet type materials with satisfactory optical quality and physical strength are adaptable. When the contours of the particular thin glass-faced laminated article being manufactured are to be other than flat, the rigid transparent plastic material selected also must be formable to the desired shape. Some examples of other transparent materials that possess the necessary transparency, toughness, and other favorable physical properties are, (a) cast sheets of polymethyl methacrylate, or slightly modified polymers of methyl methacrylate, which, in the interest of economy, will be used for many less critical applications instead of stretched polymethyl methacrylate sheets, wherein the slight modifications mentioned may be cross-linking agents plasticizers, ultaviolet absorbers, flame retarding agents, and the like, (b) cast sheets of copolymers of methyl methacrylate and other monomers, as, for example, copolymer cast sheets of methyl methacrylate and acrylonitrile, methyl methacrylate and allyl diglycol carbonate, methyl methacrylate and styrene, acrylonitrile and styrene, etc., (c) cast sheets of polycarbonates, namely reaction products of diphenyl carbonate and Bisphenol A, (d) rigid, transparent, low-colored, cast sheets of epoxy resins, such as are obtained from casting liquid reaction products of epichlorhydrin and Bisphenol A using trimethoxyboroxine as a curing agent, etc., (e) cast sheets of heat and light stabilized transparent polymers of polyvinyl chloride, etc.

It should be noted that the thin plastic face sheets 7 and 8 can be made from any of the materials named for use in making the main structural layer or unit 2 and also polymers of allyl diglycol carbonate are particularly suited for use as such face sheets 7 and 8.

Commercially available products which are adaptable to this invention as rigid transparent plastic main structural or carrier layers 2 and which are chemically members of the classes mentioned hereinbefore are the polymethyl methacrylate plastic stretched "Plexiglas 55," marketed by Goodyear Aerospace Corporation and Swedlow Plastic Company, and prepared by these vendors from "Plexiglas 55" cast sheets manufactured by Rohm and Haas Company, stretched "Plexiglas II," marketed by Rohm & Haas Company, under the trade name "Tuffak," cast "Plexiglas 55" and "Plexiglas II," marketed by Rohm and Haas Company, "Evr-Kleer," marketed by Cast Optics Corporation, Flame Resistant Acrylic "FRA-7," marketed by Polycast Corporation, etc., acrylic copolymers, such as "Plexidur T," marketed by Rohm & Haas of Germany, "Bavick II," marketed by J. T. Baker Chemical Co., "Fostacryl," marketed by Foster Grant Company, Inc., etc., polycarbonates such as "Lexan," marketed by General Electric Company, "Makrolon," marketed by Naftone, Inc., "Celenex," marketed by Celanese Plastics Company, etc., polyvinyl chloride cast sheets such as "Robeco" Glass, marketed by Robeco Technical Equipment Corporation, etc., cast epoxides developed by Midwest Research Institute, etc. It may be stated that any rigid transparent plastic possessing the necessary optical quality, which usually is prescribed or established by specifications, and having tensile strength properties of at least about 8,000 pounds per square inch, unnotched impact strength of at least about 3.5 ft. lbs., heat distortion temperature of at least about 160° F., and visible light transmission of at least about 85 percent are suitable for use as main structural layers of this invention, provided they are not adversely affected optically by one or more of the various intermediate layer liquid castable resins discussed hereinbefore and provided they may be formed to contours other than flat when this requirement is involved in the manufacture of the particular thin glass-faced plastic laminated article.

It should be noted that the various plastics and resins described hereinbefore are intended only for identification of examples of the various types of thin glass-faced laminated articles which form a part of this invention and can be manufactured using the novel methods of the invention. It should also be understood that in the interest of keeping these thin glass-faced laminated articles as light in weight as possible, the outer surface layers and the intermediate layers for attaching them to the main structural ply are made as thin as is practical, namely, from about 0.030 inch to about 0.080 inch thickness. It is further worthwhile to note that it has already been observed in the practice of this invention that in 3-layered composites in which a relatively large, for example, about two feet square, surface sheet is used, it is necessary to utilize a thin surface sheet, for example, about 0.040 inch thickness, under certain conditions and for certain types of glasses, so that the thin glass surface layers will not fracture when the composites are warped in service by stresses which are introduced by temperature changes because of differences in the thermal expansion characteristics of the thin glass surface sheet and the main structural layer. This tendency to warp is virtually eliminated in 5-ply composites wherein complementary shaped and contoured thin glass surface sheets are laminated to opposite surface areas of the main structural or carrier layer.

It should be noted that in keeping with the intent of this invention that the primary or strength contributing unit or sheet 2 may be a single, comparatively thick, rigid transparent plastic layer consisting of any material selected from the classes described hereinbefore as suitable for this purpose, or the main structural unit or carrier layer 2 may be an odd-numbered, multiple ply laminated transparent plastic structure in which at least the alternate layers and always the two surface layers are made up of materials selected from the classes of plastic described hereinbefore for use in making the layer 2. Also in keeping with the intent of the present invention, the primary structural layer, whether monolithic or laminated, may be furnished flat or contoured to any desired formable single or compound curvature shape and the contour and peripheral trim of this main structural layer 2 establishes the geometry for the finished laminated article. Furthermore, it is the intent of the invention that the thin glass outer layers 3 and/or 4 are to be furnished pretrimmed to a desired peripheral shape and contour which are complementary to the main structural layer 2 and, when two thin glass face sheets 3 and 4 are involved in a particular laminated article, they are to be furnished in accurately pretrimmed, precontoured matching pairs which are congruent to each other in shape and contour as well as complementary contoured with respect to the main structural layer 2. In cases where thin transparent plastic framing or otherwise supplementary surface cover or frame layers 7 and/or 8 are incorporated into a laminated article 1, this invention intends that the thin glass surface layer, for example, 3 and the supplementary thin rigid transparent plastic surface layer, for example 7, made from a thin transparent plastic sheet selected from the classes of materials hereinbefore discussed as suitable for this purpose, are to be prematched with respect to the surface area each is expected to cover and both are to be complementary contoured with respect to the specific surface area of the primary structural layer 2 to which each will be laminated.

It also is an intent of the invention that the preshaped and precontoured main structural layer 2 and the complementary shaped thin glass-surface layers 3 and/or 4 and, where desirable, their prematched, complementary contoured, supplementary thin rigid transparent plastic surface layers 7 and/or 8 are to be accurately positioned together according to a predetermined pattern and laminated together to form a desired thin glass-faced plastic laminated article 1 with said laminating being accomplished using comparatively thin, cast in place, cured in situ, tough, flexible, transparent, low colored, thermoset intermediate layers 5 and/or 6 and, where applicable, 5a and/or 6a, which in their final form are the fully cured products of liquid thermosetting resins selected from the classes discussed hereinbefore as suitable for use in the intermediate layers of this invention. The laminated articles of this invention may be equipped with edge-bordering devices 9 and 10, which are well known in the art and usually are constructed from resin impregnated nylon, Dacron, Orlon, or glass fiber woven fabrics and usually are bonded to the main structural layer 2 for reinforcement of the areas through which the thin glass-faced laminated plastic articles 1 of this invention are attached to other structures. These resin impregnated, cloth reinforced attachments 9 and 10 for reinforcement of mounting areas may be any style of cloth impregnated with a fully reactive resin and they may be manufactured by any of the methods usually referred to in the art as wet lay-up technique, vacuum bag impregnation, preimpregnation and press curing, wet lay-up and press curing continuous laminating etc. Choice of materials always will be commensurate with the polymeric content of the main structural layer 2 which is being reinforced. Adhesives for attaching these devices will be similarly selected. To avoid unnecessary damage to the thin glass or thin transparent plastic surface layers, they will not usually extend into the attaching or mounting areas of the thin glass-faced plastic laminated articles of this invention.

In practice of this invention, it is possible for the several layers of any multi-layered strength contributing structure unit 2, especially the alternate rigid transparent plastic layers, to be fabricated from the same, or different transparent plastic materials and/or each layer may be the same, or different thickness. In the same manner, whenever two thin glass surface layers 3 and 4 and two supplementary thin rigid transparent plastic surface layers 7 and 8 and, consequently two intermediate bonding layers 5 and 6 are incorporated into any thin glass-faced plastic composite 1, the various related layers may be either the same or different materials and thickness without detracting from the invention. However, it is noteworthy that the thicknesses of any thin glass face sheet, for example the sheet 3, and the related supplementary thin transparent plastic surface layer, for example the layer 7, although different, must be sufficiently coordinated to allow both to be attached to the primary structure or layer 2 of the laminated article with an intermediate layer, for example the layer 5, of acceptable thickness even with the variations necessary to compensate for the surface layer thickness differences where the outer surfaces of the surface layers are aligned.

In the experimental evaluation of the thin glass-faced laminated articles 1 of the invention, it has become evident that, for the manufacture of most useful laminated composites, it usually will be advisable to use primers to promote the adhesion of intermediate layers to thin glass surface layers and under certain circumstances, the rigid transparent plastic layers as well. All of the primers employed for adhesion improvement are well known in the art and, since each of the several materials which may be combined in a particular laminated article may require a different primer system, it is obvious that numerous known adhesion promoter materials are, accordingly, adaptable for use in this invention. However, it may be stated that, in general:

(a) Vinyl silanes are most useful for promoting adhesion between glass layers and polyester intermediate layers, and between most transparent plastics which are polymers of vinyl type compounds and silicone intermediate layers.

(b) Amino-or epoxy-functional silanes are useful for promoting adhesion of glass layers to epoxy type intermediate layers and also the adhesion of epoxy and polycarbonate plastic layers to silicone intermediate layers.

(c) Silicone rubber primer solutions are useful for promoting adhesion of silicone intermediate layers to glass outer layers.

(d) Phenolic lacquers are capable of improving adhesion, where necessary, of epoxy intermediate layers to plastic layers which are polymers of vinyl type compounds.

A special feature which often will be incorporated into the thin glass-faced laminated articles 1 is the capability for removal and/or prevention of ice and/or fog formation on their outer surfaces. Usually, this capability is provided in the laminates through the use of transparent electrically conductive coatings of the types described in U.S. Patents Nos. 2,628,927; 3,053,698 and 3,076,727. One example of a coating of this type which is particularly useful in these laminated products is the "81–E" coating which is applied by Liberty Mirror Division of Libbey-Owens-Fords Glass Company. This particular coating is equally applicable to glass and transparent plastics and may be described generally as a low resistance, low reflectance, vacuum deposited, transparent gold (a few molecules thickness) coating system which includes, if required, a base adhesor coat for filling microscopic irregularities in the surface being coated and for promoting adhesion to certain materials, a transparent gold, electrically conductive layer, and a quartz overcoat, all layers being vacuum deposited, together with a protective overspray coat, and suitable bus bar and lead wire assemblies. This "81–E" coating system can be deposited on either flat or curved surfaces with equal facility and is adaptable through the use of a gradient coating technique and appropriately oriented deletion lines to irregular as well as rectangular shapes. The electrically conductive coating system will be deposited prior to laminating on the inner, therefore laminating, surface of the thin glass surface layer 3 and/or the supplementary thin transparent plastic surface layer 7. For best results these face sheets will be pretrimmed to the desired peripheral shape and, where required, will be preformed to the desired contour prior to the application of the electrically conductive, coating system for removal and/or prevention of surface deposits of ice and/or fog.

METHOD AND APPARATUS OF THE INVENTION

In the manufacture of the thin glass-faced laminated articles of the present invention, novel methods of fabrication and special apparatus are required. In the method of manufacture, it is important that the various components of the laminate of the invention, such as the surface layers and the main structural layer are carefully and accurately positioned with respect to one another and that their relative positions, once established, are maintained throughout the fabrication procedure, at least until the cast-in-place, cured-in-situ intermediate layers have been processed through the curing, essentially heat-setting, stage. Hence it is a feature of the invention that the thin glass-face sheets 3 and 4 are reenforced, or fixedly positioned when they are being attached to the center sheet 2. Thus, the formation of an accurately shaped, balanced composite can be assured by the new apparatus and methods of the invention. Such positioning of one of the face sheets is obtained by use of a rigid backing member, or sheet 11, FIG. 4, that has one surface or face 12 thereof contoured complementary to the face of the preshaped and trimmed associated face sheet 3 or 4, which is ultimately to be one of the outer faces of the composite 1. The backing sheet 11 has a surface 12 over while a thin, flexible, tough plastic film 13 is tightly positioned. This plastic film 13 can be made from a suitable inert plastic material, such as "Mylar" which is Du Pont's transparent, oriented polyester film. The plastic film 13 in the apparatus preferably is of a size to extend over the edges of the backing sheet 1 and have a suitable marginal portion extending over part of the back or opposite surface of the backing sheet 11. The plastic film is drawn tight and is suitably attached and sealed to such opposite surface of the backing sheet, as by use of a flexible paper or plastic tape 14. For reasons to be described hereinafter in more detail, the face of the plastic film 13 that is adjacent the surface 12 of the backing sheet 11 is suitably embossed, as by providing a plurality of small protuberances, or projections 15 thereon so that air can flow along between the plastic film 13 and the backing sheet 11, and/or so that vacuum forces can flow therebetween, as hereinafter described. These protuberances can be applied to, or formed on the plastic film 13 in any known manner.

FIG. 4 of the drawings also brings out the fact that a plurality of small apertures are provided at a central area or portion of the plastic film 13 that is to be associated with one of the face sheets 3 or 7 at a later time. The apertures in this instance comprise a plurality of slits 16 so that suctional or vacuum forces can pass or flow through the plastic film 13 for application to the glass face sheet to draw such face sheet tightly into engagement with the surface 12 of the backing sheet 11. Such slits 16 will extend over areas of the plastic film to have the face sheet 3 or frame sheet 7 laid thereover.

Figure 5:
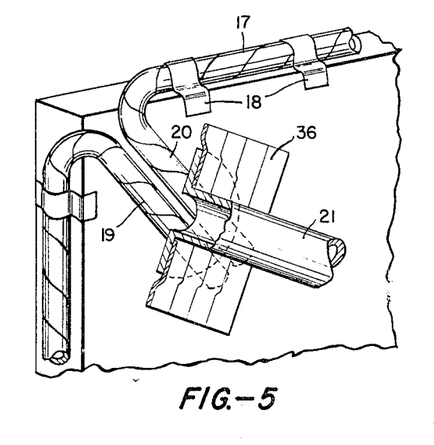
FIG. 5 is a rear fragmentary perspective view of a corner portion of the backing sheet assembly of FIG. 4.
Figure 6:
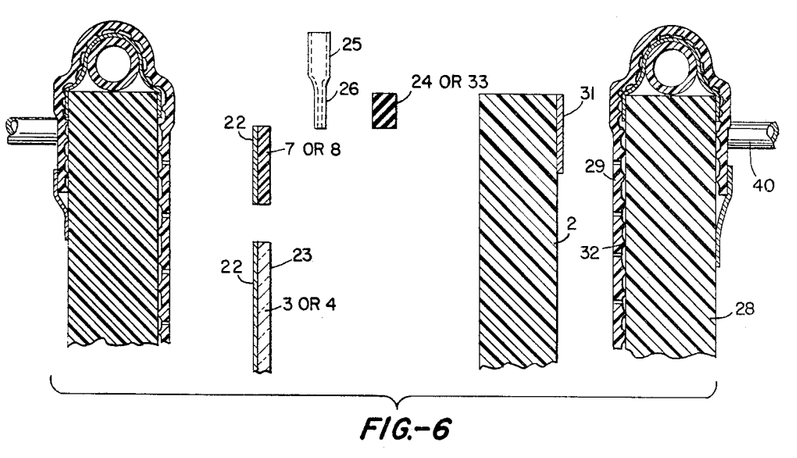
FIG. 6 is an exploded fragmentary vertical section of the apparatus used and the assembly provided during one step of the novel method of the invention.

In order to apply the vacuum to the backing sheet 11, intermediate it and the plastic film 13, and to distribute the vacuum forces around the backing sheet 11, a suitable member, such as a spirally wrapped tube 17, in which the tube convolutions are only abutted and are not sealed together, is positioned around the circumference or periphery of the backing sheet 11 and is attached thereto, as by use of a few widely separated paper tape strips 18 or the like, before the sheet 13 is attached. Naturally any apertured tube can be used in lieu of the spiral wrapped tube 17, which is shown as being made from a plastic material and which has the ends 19 and 20 thereof extending over onto the back surface of the backing sheet 11 where they operatively connect in a conventional manner to any suitable fitting means 21. Such fittings means is shown in this instance as comprising a flanged member that is suitably sealed in engagement with the inner surface of the plastic film 13 and connects to the space between such plastic film and the backing sheet 11 whereby any vacuum force, or supply applied to the fitting means 21 will be transmitted through the tube 17 to all marginal portions of the plastic film 13 for flow between such plastic film and the surface 12 to the slits 16 in the plastic film for application to the associated thin glass-face sheet.

Figure 7:
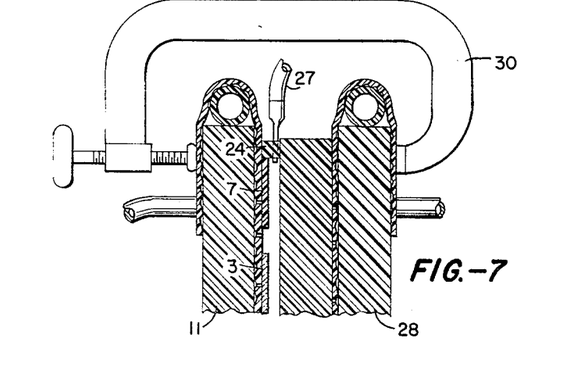
FIG. 7 is a fragmentary end elevation of the apparatus and assembly shown in FIG. 6 in its completely assembled form for producing a bonding action and a multi-ply laminate by the method of the invention.

In the production of the composite of the invention, the face sheet 3 usually has a double adhesive faced paper sealing tape 22, or the like, affixed to the entire surface thereof that is ultimately to be the outer surface in the composite. The tape 22 also is attached to the outer face of the frame sheet 7. The opposite face of the sheet 3, which is to be the inner face in the composite, and is indicated at 23, has been suitably attached to the plastic film covered backing sheet 11 and cleaned. A suitable gasket 24, which is made from any desired inactive plastic material, such as a plasticized polyvinyl chloride resin, is laid around the margins of the face sheet 3 between the backing sheet 11 and the intermediate or center sheet 2. After the center sheet is brought into direct association with the backing sheet 11, then a filling tube 25, which is shown as having a flattened end section 26, or a suitable member such as a relatively large diameter hypodermic needle, is introduced into and extends through the gasket 24 for connection to the assembly built up from the intermediate or center sheet 2 and the face sheet 3, as shown in FIG. 7. Any suitable source of a liquid castable resin then is provided for connection to this fitting 25, as by a flexible tube 27 that extends to the source of the liquid castable resin, as hereinafter described. A second backing member 28, that also has a plastic film 29 secured thereover in a manner similar to that of the assembly of the plastic film 13 onto the backing sheet 11, is provided, and such second backing sheet has a surface 32 that is complementary to the associated surface of the center sheet 2. The assembly provided in FIG. 7 also has the frame sheet 7 associated with the backing sheet 11 prior to completion of the assembly and the clamping of the gasket 24 in place. Thereafter, the entire assembly is suitably secured together, as by several conventional C-clamps 30 spaced around the periphery of the frame sheet 7. A sealing tape strip 31 has also usually been previously placed around the margins of the center sheet 2 on the surface thereof adjacent the backing sheet 28 to facilitate obtaining a sealed peripheral connection between the center sheet and the backing member provided thereto. If necessary, other sealing means may be provided around the periphery of the laminate assembly to seal the liquid resin used to form the bonding layer in place. Normally the gasket 24 will be abutted against the peripheral portion of the frame sheet or member 7.

Vacuum forces usually are applied to both of the backing sheets 11 and 28 prior to their assembly into the structure shown in FIG. 7 and these forces hold the frame sheet 7 and the face sheet 3 tightly against the backing sheet 11 and also the vacuum forces hold the center sheet 2 in tight engagement with the backing sheet 28.

After the assembly shown in FIG. 7 has been prepared, then the liquid resin material to be used for forming the bonding layer 5 is caused, either by gravity or positive pressure of several pounds per inch, to flow through the tube 27 and the fitting or filling tube 25 into the space provided intermediate the face sheet 4 and the adjacent surface of the center sheet 2. At such time the laminate assembly is inclined at an angle of about 30° to 45° to the horizontal. In building the composite of the invention, initially these glass sheets 3 and 4 are formed to a desired contour, and then are accurately sized and trimmed so that they will provide the desired center section, or 5-ply laminate of the size shown in FIG. 1. The entire assembly, after the liquid, castable thermosetting resin material has been caused to flow into the space provided therefore in the laminate, is then ready to be set by a heating operation. Usually it is desirable to have some type of a conventional vent tube, like the needle, or filling tube 25 provided at the top portion of the composite assembly so that any entrapped air in the laminate can be bled therefrom and a complete filling of this space between the center sheet and the face sheet can be obtained and be free from any entrapped air bubbles.

The face surfaces of the center sheet 2 are suitably prepared, cleaned and/or processed in any desired manner before assembly of such center sheet into the laminating unit for attachment of the face sheet or sheets thereto.

After filling the laminate assembly shown in FIG. 7 with the liquid resin, the assembly can be permitted to stand for 30 to 60 minutes at room temperature to permit any bubbles therein to migrate to the upper edge of the assembly and insure a good wetting of the face sheet surface with the bonding layer of resin. The filling and venting openings are then suitably sealed. Next the assembly is placed in a substantially horizontal position (about 5° to horizontal), in a suitable heated chamber, such as an oven with circulating air therein, where an oven temperature can be provided at approximately 150° to 220° F. and usually not in excess thereof, for approximately 13 hours, or more, as required, in order to cure the material forming the bonding layer 5 in the composite. During all this time, the vacuum supplied through fitting means 21 and 40 is maintained and such vacuum insures a substantially even, uniform positioning or spacing of the face sheet 3 in relation to the adjacent center unit, or sheet 2 so that a balanced, accurately contoured laminate can be produced. The laminate assembly has, of course, been suitably completely sealed prior to the heating step.

After this bonding layer 5 has been set by the heating action described, then in most instances in the practice of the invention, it is desired to secure the second glass-face sheet 4 to the remaining surface of the center sheet 2. To obtain this construction, the face sheet 4, which has been secured to a third backing member, not shown, in the same manner that the face sheet 3 is associated with the backing sheet 11, is added to the assembly. Such third backing sheet is preshaped and sized to a contour complementary to the outer face or surface of the glass sheet 4. Hence the clamps 30 are removed, and the backing member or sheet 28 is removed from engagement with the one face of the center sheet 2, after which the assembly of the third backing sheet and the face sheet 4 can be attached to the center sheet unit. Naturally the face sheet 4 and the frame sheet 8 are accurately located in relation to the surface 33 of the center sheet and the complementary contours of the assembled sheets. Previously the third backing sheet assembly has been provided with a suitable gasket member, like the gasket 24, and the frame means or sheet 8 has been associated therewith in the manner previously described, the gasket member being suitably sealed to the final assembly in the same manner as the gasket 24. Next, similar clamps to the clamps 30 are used to attach the third backing sheet and the face sheet 4 assembly to the unit formed from the center sheet 2 and the backing sheet 11 and associated means so that the assembly is suitably clamped together around its periphery The vacuum forces applied to the face sheet 3 are maintained during this disassembly and reassembly procedure to prevent the three ply composite from warping. At this stage, the face sheet 4 is tightly drawn against its associated backing sheet by a vacuum and the face sheet 4 is accurately positioned and spaced in relation to the remaining face or surface of the center sheet 2. Thereafter, a liquid castable resin is caused, as before, to flow into the space between the face sheet 4 and the center sheet 2, and the liquid resin is cured, or set in situ to form the bonding layer 6 in the manner previously described. The second face 33 of the center sheet 2 is suitably cleaned, as desired, before the assembly of the glass-face sheet 4 is attached thereto.

Afer the second bonding layer 6 has been set in position, the vacuum supply forces provided for the assembly are removed and the clamp means securing the assembly together are removed. The desired composite then is obtained by removing the backing sheet 11 from association with the face sheet 3, which action preferably is best obtained by freeing the marginal edges of the plastic film 13 from engagement with the backing sheet 11 and removing the backing sheet after which the plastic film 13 can be stripped from engagement with the paper tape 22. Thereafter, the paper tape layer 22 would be removed and any desired cleaning action can be performed upon the exposed outer face of the face sheet 3 and of the associated cover sheet 7. Similar removing and cleaning opperations are also performed on the remaining face sheet and its positioning means. Next, any appropriate edge reenforcements may be installed, holes drilled in the laminate, etc. to complete it for assembly. Then after any desired final trimming of the structural layer or center sheet 2, the laminate, or composite would be ready for assembly on, or attachment to the desired vehicle or member.

It should be noted that the pretrimming and preforming of the thin glass and thin plastic surface layers to their final precise sizes and shapes precludes the positioning of gaskets, which are so essential to the processing of castable interlayers, between the thin outer layers and the main structural ply, unless, of course, these gaskets are to remain as part of the finished laminated composite. Consequently, the casting gaskets have to be positioned around the peripheries of the face sheet or the frame sheet, and between the main structural layer, or center sheet 2 of the laminated article and the rigid backing structure which supports the thin surface sheet. Hence the casting gasket thicknesses usually are designed to maintain space equivalnt to the combined thicknesses of the thin surface layer and the intermediate bonding layer plus any allowance for intermediate layer shrinkage during cure. This positioning of the casting gasket 24, for example, outside the trimmed edges of the thin surface layers also requires that the devices used for sealing around the edges of the thin surface layers, or between the thin surface layers and the rigid backing structure are completely and continuously liquid tight until the castable intermediate bonding layer is heat set.

Another feature of the present invention is the providing of peripheral casting gaskets, such as the gaskets 24, which have sufficient firmness, although flexible, at the conditions under which the casting apparatus is assembled to withstand applied clamping pressure, without support or appreciable compression, but which, at the conditions used for curing the intermediate layer resin, are sufficiently compressed by the same applied clamping pressures to allow the layers being so laminated to automatically move together as required to compensate for shrinkage of the interlayer resin during cure.

The strength providing main structural transparent plastic layer, or carrier, or intermediate sheet 2 is usually comparatively thicker than the other layers of the composite. It may be monolithic or laminated. It may be furnished flat or preformed to any reasonable single or compound curvature shape, using any of various forming methods well known in the art as prescribed for the particular plastic or plastics involved. This main structural layer 2 usually will be pretrimmed to a desired peripheral shape which is usually slightly larger in all directions than the desired dimensions of the finished laminated article 1. Any known trimming method adaptable to the particular plastics or plastics involved may be used.

The two thin glass-face sheets 3 and 4 are furnished precisely pretrimmed and complementary contoured as required for laminating to prespecified congruent surface areas of the main structural layer 2. Cutting to size and preshaping may be accomplished by any method recommended for the particular glass, or glasses involved. Preforming is conveniently accomplished by a process which consists of placing a properly contoured male or female mold into a cold oven, positioning the thin glass-face sheet into the mold, heating the oven, mold, and thin glass simultaneously to the lowest temperature (at least about 1000° F.) at which the thin glass will slowly conform to the mold contour, allowing the heating to continue for at least a few hours, until forming is completed without using external pressure, and then allowing oven, mold, and glass to cool slowly to at least 300° F. before opening the oven doors. Chemical strengthening, tempering annealing, application of electrically conductive coatings, etc, where required, will be accomplished after forming.

As stated generally hereinbefore, the backing structures 11 and 28 are constructed so that one surface of each 12 and 32, respectively, is complementary contoured exactly as required to accurately support during laminating the outer surface of the thin face sheets 3 and 7 and one surface of the main structural layer 2. The third such backing structure would be complementary to the outer surfaces of the thin face sheets 4 and 8, respectively. This means that the actual contours of surfaces 12 and 32 are slightly different and that the degree of difference depends primarily on the overall thickness of the finished laminated article 1, the thickness of the main structural layer or ply 2 and the sequence of laminating, that is, whether surface sheets 3 and 7, or 4 and 8 are to be laminated first to the main structural ply 2. The complementary contoured surfaces 12 and 32 and equivalent one of the third backing plate are provided with markings as required to aid in the exact positioning of the respective face sheets in a prespecified pattern. In addition, the backing structures are equipped with dowel pins, corner plates, edge reference lines or the like, to facilitate accurately mating them together repeatedly, thereby assuring that the carefully located supported layers always will be accurately positioned when the assemblies are brought together for laminating.

In practice of the method of the invention, after all three complementary contoured, rigid, backing structures have been equipped with contoured surface film covers as described typically hereinbefore for the backing structure 11, the respective thin glass and/or plastic layers to be supported are cleaned, primed, if necessary, equipped with transparent electrically conductive coatings, if applicable, located on the proper film-covered rigid backing structure using the reference marks provided, secured in place with vacuum, and appropriately sealed. Cleaning the surfaces of the various face sheets may be accomplished with a number of well known methods and materials. One method, for example, which has been found essentially appropriate for most glass and plastic surfaces involves scrubbing the surface thoroughly with cotton flannel soaked until dripping with a thin water slurry of a polishing compound such as, for example, a slurry containing at least about 10 percent of finely divided cerium oxide, iron oxide, pumice, etc. such as are used for example by jewelers to polish gold articles and by lens manufacturers to finish the surfaces of glass and plastic lenses and prisms, then rinsing with copious amounts of water and rubbing with clean flannel as required to eliminate all traces of the polishing compound and the foreign particles it loosened from the surface, then scrubbing with isopropyl alcohol dampened cotton flannel before the rinse water film and/or droplets have a chance to dry and form water scale, then exposing the cleaned, dried surface to a temperature of about 150° F. for at least about 30 minutes to assure that all traces of water and/or alcohol are removed. Other cleaning solutions which are applicable are the so-called dilute acid washes, which are essentially dilute solutions, up to about 20 percent, in water of mineral acids, hydrochloric, hydrofluoric, sulfuric, nitric, etc. Other cleaning solutions which may be employed are aqueous solutions of oxidizing agents, for example, acid-dichromate solutions, and the like. Application of primers for promoting adhesion of the intermediate or bonding layers 5 and 6 where required, will be selected according to the intermediate and rigid plastic or glass layers involved, as suggested hereinbefore, and application methods vary widely and must be specifically recommended according to the primers being used. Cleaning and priming, where necessary, always will precede the application of any electrically conductive transparent coating systems, and such coating systems, which are applicable to the invention, are discussed hereinbefore. Liquid-tight sealing of the edges of the accurately positioned face sheets so that vacuum pressure may be used without resin leakage to secure the composite layers to their backing structures during laminating must be accomplished either with an edge sealing compound which does not contaminate the laminating surfaces and/or the intermediate layer resin, or with a thin layer of adhesive, double-adhering thin film, or, as suggested in the drawings, double-faced pressure sensitive adhesive tape 22 or 31 may be used, wherein the adhesive qualities are not destroyed by the intermediate layer resins, or curing conditions and whose adhesives will not flow sufficiently during laminating to close the apertures 16 in the film 13 through which vacuum is applied to the supported outer layers, or main structural layer. In some methods of manufacture, it may be advisable to provide the necessary seal with a shallow trough or groove, filled with an inert, putty-like sealing compound, which is integrated into the rigid backing structure and is located so that it falls just inside the peripheral trim edge of the properly positioned, vacuum secured, rigid supported member of the composite. When double-faced adhesive tapes 22 are installed between the thin glass or thin plastic surface sheets, they must be applied to the entire surface area to prevent the influence of its thickness from causing optical distortions or angular deviations in the finished composite. The double backed adhesive tape 31, on the other hand, although it may be the same material as the tape 22, may be applied only to the periphery of the comparatively thicker main structural ply 2.

In the formula for long chain aliphatic diepoxides set forth hereinbefore, the letter N represents any number between 1 to 12, while the letter R represents radicals such as hydrogen, hydroxy, methyl, ethyl, methoxy, ethoxy, methylol, ethylol, etc., and the letter R' represents the same radicals as does the symbol R. The groups represented by these letters in this formula can either be the same or different ones of the radicals listed hereinbefore.

It will be realized that conventional spring clamps can be used in place of the clamps 30 for improved take-up of the laminate shrinkage during setting of the bonding layer.

When referring to the accurately formed, contoured composites of the invention, it will be realized that in many instances the tolerances for these structures will vary appreciably. Thus in some instances the tolerances may be plus or minus .010 inch, whereas in some other embodiments of composites of the invention, the tolerances may only be, for example, plus .005 inch. In some uses of these composites, the tolerances are not so severe and may be as much as plus or minus .030 inch. Hence the requirements for accuracy and the precautions taken in the process of the invention may vary dependent upon the operative limits of the structure to be produced. For example, if a very large tolerance is permitted in the composite, it may be necessary to reenforce the exposed face of the relatively thick center layer, or structural support unit 2 that is provided in the composite when attaching the first glass sheet thereto, as the support unit 2 will have sufficient strength to prevent any appreciable distortion thereof in the assembly procedures.

It should be noted that the bonding layer or layers used in the composite of the invention may be thinner than the thin glass-face sheets used, or such bonding layers may be slightly thicker depending upon the operative conditions desired in the composite to be produced. In all events, it will be realized that the process of and apparatus of the invention permits these relatively thin, preshaped glass sheets to be firmly supported by being drawn against rigid backing members when opposite faces of the glass sheets are being associated with and bonded to the carrier layer or center structural support unit of the composite. By accurately positioning the glass sheets in fixed but uniformly spaced relation to the associated center or support unit or layer in the assembly being produced, then the resultant bonding layer obtained will be of uniform thickness throughout when thermoset, or cured after being flowed in liquid form into position between the associated layers of the composite. Naturally to produce any balanced, accurately sized and shaped composite, it is necessary that these bonding layers be of substantially uniform thickness throughout and this uniform thickness description of these bonding layers is meant to cover any slight variation in such thicknesses as are permitted by the tolerances of the composite being produced, while also permitting some tolerance in the other layers of the composite.

From the detailed description of the thin glass-faced laminated articles of this invention, it is evident that they are closely interrelated to the laminates described in our co-pending United States patent application Ser. No. 778,414, applied for Dec. 5, 1958, now U.S. Patent No. 3,135,645. The primary differences in the laminated articles of these two inventions is the substitution in the present invention of thin glass abrasion and scratch resistant surface layers in most instances, for the thermal barrier surface layers of the previous invention. However, it is evident from the discussion hereinbefore that the objectives of the two inventions may be combined in articles wherein the main structural layer 2 is a laminated composite.

It will be realized that any suitable control valves can be provided in the vacuum supply lines or tubes used in the apparatus of the invention, or that other suitable vacuum controls can be provided.

"Tedlar" polytetrafluoroethylene film marketed by E. I. du Pont de Nemours and Co., is another suitable film for use and equivalent in the apparatus of the invention.

Numerous possible variations in the composition, design, shape, and contour of the thin glass-faced laminated articles of the present invention which may be manufactured using the methods and apparatus of the invention have been discussed hereinbefore. It will be noted that novel and improved composites are provided by the invention and that the objects thereof have been achieved.

While certain representative embodiments and details hav been shown for the purpose of illustrating the invention, it will be apparent to those skilled in this art that various changes and modifications may be made therein without departing from the spirit or scope of the invention.

What is claimed is:

1. In a process of making an accurately shaped multi-ply laminate, the steps of reenforcing a sheet of a contoured stretched molecularly oriented polymer of methyl methacrylate, which is to form the center layer in the laminate, by attaching a complementary contoured reenforcing member to one face of said center layer, reenforcing one face of each of two glass sheets which are contoured complementary to the surfaces of said center layer and are to be the outer layers of the laminate by attaching complementary contoured reenforcing members thereto, said faces being the outer faces of said glass sheets in the laminate to be produced, applying and maintaining a vacuum intermediate one of said glass sheets and its reenforcing member over the area of such glass sheet to retain said one glass sheet in a given shape, securing said one glass sheet to the other face of said center layer in evenly spaced relation thereto, flowing a castable liquid thermosetting resin intermediate said one glass sheet and said center layer and setting such resin by heat to bond said one glass sheet to said other face of said center layer, applying a vacuum between said other glass sheet and its reenforcing member over the area of such glass sheet to retain it in a given shape, removing the reenforcing member from said one face of said center layer, associating one face of said other glass sheet with said one face of said center layer and securing it to such layer in evenly spaced relation thereto, flowing a castable liquid thermosetting resin intermediate said other glass sheet and said center layer and setting it by heat to bond said other glass sheet to said center layer, removing the vacuums from both of said glass sheets which have been maintained thereon through all of the foregoing steps, and separating said reenforcing members from said glass sheets to obtain the finished laminate.

2. In a process for forming a multi-ply composite including a thin glass outer layer, the steps of attaching a thin plastic film to a surface of a rigid backing sheet, said film having a number of apertures in a portion thereof spaced from its edges and having small air passageway forming embossments on its surfaces that is adjacent said backing sheet, covering the face of a preshaped thin glass sheet with double faced removable adhesive means, placing one face of the adhesive means in contact with said film to cover part of the apertured portion thereof, positioning one face of a preshaped frame sheet over another part of said apertured portion of said film in predetermined laterally spaced relation to said glass sheet, said rigid backing sheet being contoured complementary to the other faces of said glass and frame sheets, applying a vacuum between said backing sheet and said film for transmission to the entire areas of said one face of said glass sheet and to said one face of said frame sheet to retain them in their preformed shapes, attaching the other face of said thin glass sheet and of said frame sheet to a carrier laminating sheet in uniformly spaced relation thereto, securing all of said sheets together by a liquid thermosetting resin that is heat cured in situ between said laminating sheet and said glass and cover sheets, removing the vacuum, and removing said double faced adhesive means to obtain the laminate.

3. In a process for forming a multi-ply laminate including a thin glass outer layer, the steps of attaching a thin plastic film over the entire surface of and securing it only to the edges of a rigid backing sheet, said film having a number of apertures in a center portion thereof, associating one face of a thin glass sheet smaller in both dimensions than said backing sheet with said film to cover the apertured center portion thereof and applying a double faced adhesive layer to said one face of the thin glass sheet prior to its association with said backing sheet, applying a vacuum to said backing sheet between it and said film for operative transmission to said one face of said glass sheet to draw the entire area of said one face tightly against said backing sheet.

attaching the other face of said thin glass sheet to one surface of a carrier laminating member, in evenly spaced relation thereto, said other face of said glass sheet and said one surface of said laminating member being of complementary curved contours, flowing a liquid thermosetting resin into the space between said glass sheet and laminating member, sealing the liquid resin in place, heating the sealed assembly of the glass sheet and laminating member to cure the resin and bond the glass sheet to the laminating member, removing the vacuum, and disengaging the backing sheet and double faced adhesive means from the laminating member to obtain the laminate.

References Cited

UNITED STATES PATENTS

| | | | |
|---|---|---|---|
| 3,334,008 | 8/1967 | Park et al. | 161—193 |
| 3,060,652 | 10/1962 | Eckman. | |
| 2,987,098 | 6/1961 | Daniel. | |
| 2,782,574 | 2/1957 | Copold. | |
| 1,851,028 | 3/1932 | Worrali. | |

ROBERT F. BURNETT, Primary Examiner

M. A. LITMAN, Assistant Examiner

U.S. Cl. X.R.

161—1, 192; 264—261